US012439313B2

United States Patent
Diao (10) Patent No.: US 12,439,313 B2
(45) Date of Patent: Oct. 7, 2025

(54) INTER-DONOR TOPOLOGY ADAPTATION IN INTEGRATED ACCESS AND BACKHAUL NETWORKS

(71) Applicant: ZTE Corporation, Guangdong (CN)

(72) Inventor: Xueying Diao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 287 days.

(21) Appl. No.: 17/875,948

(22) Filed: Jul. 28, 2022

(65) Prior Publication Data

US 2022/0369190 A1 Nov. 17, 2022

Related U.S. Application Data

(63) Continuation of application No. PCT/CN2020/075542, filed on Feb. 17, 2020.

(51) Int. Cl.
| | |
|---|---|
| *H04W 36/12* | (2009.01) |
| *H04W 36/08* | (2009.01) |
| *H04W 76/20* | (2018.01) |
| *H04W 72/23* | (2023.01) |
| *H04W 88/08* | (2009.01) |

(52) U.S. Cl.
CPC ......... *H04W 36/12* (2013.01); *H04W 36/08* (2013.01); *H04W 76/20* (2018.02); *H04W 72/23* (2023.01); *H04W 88/08* (2013.01)

(58) Field of Classification Search
CPC ..... H04W 36/12; H04W 36/08; H04W 76/20; H04W 72/23; H04W 88/08
See application file for complete search history.

(56) References Cited

U.S. PATENT DOCUMENTS

| | | | |
|---|---|---|---|
| 2021/0227435 A1* | 7/2021 | Hsieh | H04W 36/087 |
| 2021/0258847 A1* | 8/2021 | Wu | H04W 24/02 |
| 2021/0368409 A1 | 11/2021 | Liu et al. | |
| 2022/0141749 A1 | 5/2022 | Luo et al. | |

(Continued)

FOREIGN PATENT DOCUMENTS

| | | |
|---|---|---|
| CN | 110536350 A | 12/2019 |
| CN | 110536351 A | 12/2019 |
| CN | 111586744 A | 8/2020 |

(Continued)

OTHER PUBLICATIONS

ZTE et al., "Discussion on inter-CU IAB migration handling," 3GPP TSG RAN WG3 Meeting #106, Reno, USA, R3-196689, Nov. 2019 (4 pages).

(Continued)

*Primary Examiner* — Mohammad S Adhami
*Assistant Examiner* — Andrew Chanul Kim
(74) *Attorney, Agent, or Firm* — Perkins Coie LLP (57) ABSTRACT

Methods, systems, and devices for inter-donor topology adaptation in integrated access and backhaul (IAB) networks are described. An example method for wireless communication includes transmitting, by a source donor, a first message comprising an indication that a migrating IAB node is configured to perform an inter-donor switching operation, and receiving a second message comprising feedback information, wherein the source donor is communicatively coupled to the migrating IAB node and a plurality of nodes that are downstream from the migrating IAB node.

20 Claims, 5 Drawing Sheets

(56) References Cited

U.S. PATENT DOCUMENTS

2022/0263797 A1* 8/2022 Liu .................. H04W 36/0009
2023/0098848 A1* 3/2023 Ishii ................. H04W 36/0033
                                                                370/216

FOREIGN PATENT DOCUMENTS

WO      2019/066692 A1    4/2019
WO        2019246446 A1  12/2019

OTHER PUBLICATIONS

International Search Report and Written Opinion for International Application No. PCT/CN2020/075542, mailed on Nov. 26, 2020 (8 pages).
3GPP, "Technical Specification Group Radio Access Network; NR; Study on Integrated Access and Backhaul; (Release 16)," 3GPP TR 38.874 V16.0.0 (Dec. 2018).
ZTE et al., "Discussion on network-controlled IAB migration handling," 3GPP TSG RAN WG3 Meeting #104, R3-192519, Reno, USA, May 13-17, 2019 (5 pages).
Extended Search Report for European Patent Application No. 20887765.4, mailed Jul. 19, 2023 (13 pages).
LG Electronics Inc., "Inter-donor topology adaptation for architecture 1a," 3GPP TSG-RAN WG3 #102, R3-186751, Spokane, WA, USA, Nov. 12-16, 2018 (7 pages).
Nokia et al., "Remaining issues of BAP," 3GPP TSG-RAN WG2 Meeting #109-e, R2-2001060, Online, Feb. 24-Mar. 6, 2020 (3 pages).
Office Action for Japanese Patent Application No. 2022-546013, mailed Aug. 28, 2023, with English summary (10 pages).
CNIPA, First Office Action for Chinese Application No. 202080095896.X, mailed on Jul. 16, 2024, 23 pages with unofficial English translation.
KIPO, Office Action for Korean Application No. 10-2022-7026470, mailed on Jul. 19, 2024, 9 pages with unofficial English translation.
IP Office Vietnam, Office Action for Vietnamese Application No. 1-2022-04811, mailed on Sep. 5, 2024, 4 pages with unofficial English translation.
Samsung, "IP address management during the IAB migration," 3GPP TSG RAN WG3 #105bis, Chongqing, China, R3-195001, Oct. 14-18, 2019, 5 pages.
Registration Procedure Notice and Notification of Grant of Invention Patent Right of Chinese Patent Application No. 202080095896.X, dated Jan. 3, 2025, 4 pages.
Office Action for Chinese Patent Application No. 202080095896.X, mailed Nov. 12, 2024, 12 pages.
EPO, Communication pursuant to Article 94(3) EPC for European Application No. 20 887 765.4, mailed on Jun. 17, 2025, 7 pages.
INPI, First Examination Report for Indian Application No. 202247040676, mailed on Jun. 17, 2025, 12 pages with unofficial English translation.

* cited by examiner

INTER-DONOR TOPOLOGY ADAPTATION IN INTEGRATED ACCESS AND BACKHAUL NETWORKS

CROSS REFERENCE TO RELATED APPLICATIONS

This patent document is a continuation of and claims benefit of priority to International Patent Application No. PCT/CN2020/075542, filed on Feb. 17, 2020. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques will provide support for an integrated access and backhaul network.

SUMMARY

This document relates to methods, systems, and devices for inter-donor topology adaptation in integrated access and backhaul (IAB) networks in mobile communication technology, including 5th Generation (5G) and New Radio (NR) communication systems.

In one exemplary aspect, a wireless communication method is disclosed. The method includes transmitting, by a source donor, a first message comprising an indication that a migrating integrated access and backhaul (IAB) node is configured to perform an inter-donor switching operation, and receiving a second message comprising feedback information, wherein the source donor is communicatively coupled to the migrating IAB node and a plurality of nodes that are downstream from the migrating IAB node.

In another exemplary aspect, a wireless communication method is disclosed. The method includes receiving, by a migrating integrated access and backhaul (IAB) node from a source donor, a first message comprising an indication that the migrating IAB node is configured to perform an inter-donor switching operation, and transmitting, to at least one child node of the migrating IAB node, a second message comprising the indication, wherein the source donor is communicatively coupled to the migrating IAB node and a plurality of nodes that are downstream from the migrating IAB node.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

In contrast with Long Term Evolution (LTE) systems, emerging 5G and NR systems have larger available bandwidths, support massive MIMO, and the use of multiple beam (e.g., beamforming) techniques, which enables the support and capability of integrated access and backhaul (IAB) links.

The present document uses examples from the 3GPP New Radio (NR) network architecture and 5G protocol only to facilitate understanding and the disclosed techniques and embodiments may be practiced in other wireless systems that use different communication protocols than the 3GPP protocols.

Figure 1:
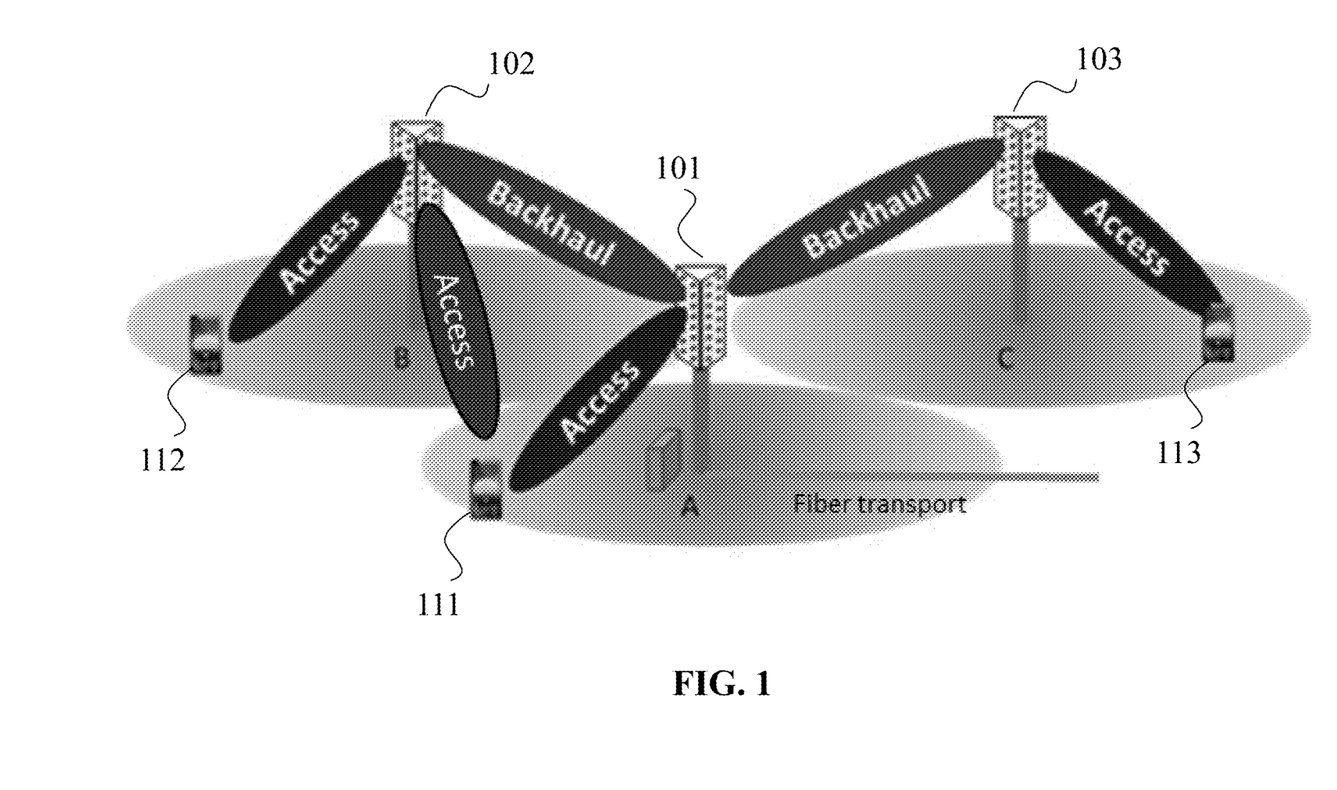
FIG. 1 shows an example of an IAB network.

Wireless backhaul links and relay links enable the flexible deployment of denser NR cell networks without the need to increase the dense deployment of conventional transmission network elements. FIG. 1 shows an example of a network with integrated access and backhaul (IAB) links. As shown therein, A (101), B (102) and C (103) are access nodes, user equipment (UEs 111, 112 and 113) can communicate with the access nodes A, B and C through access links. There is only a wired connection between access node A and the core network, but no wired connection between access nodes B and C and core network elements. An access node that supports wireless access of the UE and wirelessly transmits data is called an IAB node (e.g., 102 or 103), whereas an access node that provides a wireless backhaul function for the IAB node to enable the UE to connect to the core network is called an IAB donor (e.g., 101). Thus, the access nodes can transmit UE data through a wireless backhaul link.

In an example, the access node B may send data received from the UE to the access node A through a wireless backhaul link, and then the access node A sends the UE data to the core network element. For the downlink, the core network element can send the UE data packet to the access node A, and then the access node A sends the UE data to the access node B via the wireless backhaul link, and the access node B sends the UE data via the access link. In some embodiments, the access link and the backhaul link can use the same carrier frequency. In other embodiments, they may use different carrier frequencies. In some embodiments, UE data may need to be transmitted through a multi-hop relay backhaul link between the access node and the core network.

In some embodiments, an access node can include a Control Unit (CU) and one or more Distributed Unit(s) (DU(s)). In an example, the CU is a logical node hosting radio resource control (RRC), service data adaptation protocol (SDAP) and packet data convergence protocol (PDCP)

of the access node that controls the operation of one or more DUs. The DU is a logical node hosting radio link control (RLC), medium access control (MAC) and physical (PHY) layers of the access node. The CU and the DU(s) it controls are connected via the F1 interface. The F1 application protocol (F1-AP) is used for conveying the lower-layer configuration information of the radio bearers between the CU and DU, as well as the setting up of a GTP tunnel between the DU and CU for each radio bearer. The CU/DU separation, which is supported in NR, is also supported in IAB deployments.

Figure 2:
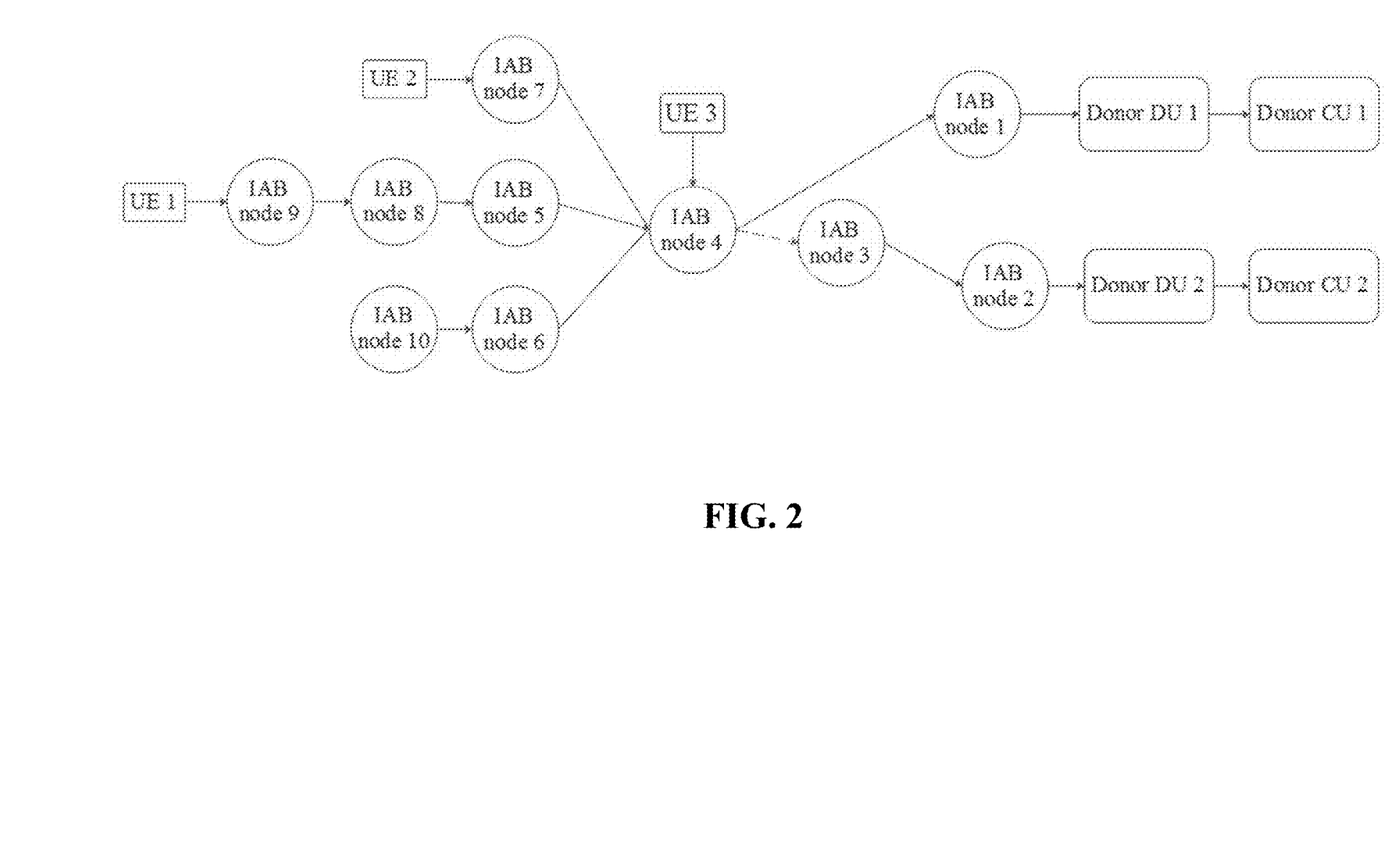
FIG. 2 shows an example topology of an IAB network with multiple downstream nodes.

FIG. 2 shows an example topology of an IAB node performing an inter-donor (or inter-CU) switching operation. As shown therein, the inter-donor handover includes the migrating IAB node measuring poor link quality, performing measurements, and then sending a measurement report to the source donor (or original donor CU). At this time, the migrating IAB node has not determined whether it will perform intra-CU migration or inter-CU migration.

In some embodiments, after the original donor CU has received the measurement report and decided to perform an inter-CU switching operation on the migrating IAB node, one of the two following procedures may be implemented.

Implementation 1: The original donor CU is configured to transmit an RRC or F1-AP message to the child nodes of the migrating IAB node. In some embodiments, the message includes an indication of the parent node's intention to perform an inter-CU switching operation. If the child node intends to switch with the migrating IAB node, the child node responds with an RRC or F1AP message, and the message carries feedback information, which indicates that the inter-CU switch is approved. In some embodiments, the child node sends a measurement report (e.g., in an RRC message) to the original donor CU. The original donor CU then receives this RRC or F1-AP feedback message. If the feedback indicates that the inter-CU switch is approved, the original donor CU is further configured to send a subsequent RRC or F1-AP message to the grandchild nodes of the migrating IAB node (i.e., the child nodes of the child nodes of the migrating IAB node) to determine whether the grandchild nodes wish to follow the parent node in performing the inter-CU switching operation.

Implementation 2: In some embodiments, the original donor CU sends an RRC or F1-AP message to the migrating IAB node, and the message carries an instruction message indicating that the migrating IAB node will perform inter-CU switching. Upon receiving the message from the original donor CU, the migrating IAB node constructs a backhaul adaptation protocol (BAP) control protocol data unit (PDU) or a Medium Access Control (MAC) control element (CE). This control PDU or MAC CE is sent to the child nodes of the migrating IAB node to inform them that their parent node is about to perform an inter-CU migration. After the child nodes receive the BAP control PDU or MAC CE, and if they have determined to switch along with the migrating IAB node, each of those child nodes responds to the original donor CU via an RRC or F1-AP message. This feedback message carries an indication of agreeing to participate in the inter-CU switching operation. In some embodiments, the child node sends a measurement report to the original donor CU. Concurrently, the child node constructs a BAP control PDU or MAC CE to inform any grandchild nodes of the migrating IAB node that it wants to perform inter-CU switching.

In some embodiments, and after the original donor CU collects all the IAB nodes and UEs to be switched, it sends a handover request to the target donor CU. In an example, the handover request includes an Xn application protocol (Xn-AP) ID assigned by the original donor CU to all MTs and UEs, the context info of each UE and MT, the established backhaul (BH) RLC channel ID, and BH RLC channel quality-of-service (QoS) information. In some embodiments, the keys of all MTs and UEs (except for that of the migrating IAB node that will be assigned a new key by the target donor CU) may be included in the handover request.

In some embodiments, and after receiving the handover request, the target donor CU performs admission control. If the target donor CU can support all IAB nodes and UEs that intend to switch, it responds with a handover request acknowledgment to the original donor CU. On the other hand, if the target donor CU can only accept a subset of the IAB nodes and UEs, then the target donor CU sends a handover request acknowledgment message to the original donor CU, which includes the Target NG-RAN node UE XnAP ID assigned to the MTs and UEs. In particular, the handover request acknowledgment message includes the Source NG-RAN node UE XnAP IDs.of the accepted IAB-MTs and UEs, the RRC Reconfiguration message sent to the migrating IAB node, and the RRC Reconfiguration message for the accepted downstream IAB nodes.

In some embodiments, the RRC Reconfiguration message sent to the migrating IAB node includes:
  routing info;
  backhaul (BH) RLC channel configuration;
  migrating IAB node IP address (if the IP address is generated by target donor);
  IP addresses used in a control plane domain;
  IP addresses used in a user plane domain;
  BAP address; and/or
  target donor CU CP IP address.

In some embodiments, the RRC Reconfiguration message sent to accepted downstream nodes includes:
  a new key;
  routing info;
  BH RLC channel configuration;
  IP address (if the IP address is generated by target donor);
  IP addresses used in a control plane domain;
  IP addresses used in a user plane domain;
  BAP address; and/or
  target donor CU CP IP address.

The RRC Reconfiguration message may include an indication of the message being from the target donor CU in order to prevent the IAB node from feeding back a RRC Reconfiguration Complete message to the original donor CU.

In some embodiments, and after receiving the handover request acknowledgment message, the original donor CU sends an RRC Reconfiguration message to the migrating IAB node. If the acknowledgment message also contains the RRC Reconfiguration message sent to the downstream nodes and the UE, the original IAB node first sends an RRC Reconfiguration message to these nodes and UEs, and finally sends an RRC Reconfiguration message to the migrating IAB node.

In some embodiments, and after the migrating IAB node successfully connects to the target donor CU, the F1 setup process is performed. After the migrating IAB node F1 setup is successful, it can serve the UE and child nodes. However, at this time, the one or more child nodes do not know that each of them should to initiate the F1 setup process.

In some embodiments, and after the migrating IAB node F1 setup is successful, a BAP control PDU or MAC CE is constructed and sent to the child node. The PDU or MAC CE is used to indicate that the migrating IAB node can serve the child node. If the child node has previously received the RRC Reconfiguration message, then after receiving the indication sent by the parent node, the RRC Reconfiguration Complete message is returned to the target donor CU. If an IP address has assigned to the child node by Operations, Administration and Maintenance (OAM), the child node also includes that IP address in the RRC Reconfiguration Complete message.

In some embodiments, and after the target donor CU sends the F1 SETUP RESPONSE to the migrating IAB node, if the RRC Reconfiguration message has not been sent to the child node before, and the child node's key is obtained in the handover request message, then the key is used to send the RRC Reconfiguration message to the child node. In an example, the RRC Reconfiguration message includes:
new key;
routing info;
BH RLC channel configuration;
IP address (if IP address is generated by target donor);
IP addresses used in a control plane domain;
IP addresses used in a user plane domain;
BAP address; and/or
target donor CU CP IP address.

Embodiments of the disclosed technology also provides methods and systems to determine which downstream nodes follow the migrating IAB node for inter-CU switching.

In some embodiments, it is assumed that the original donor CU knows that the migrating IAB node will perform inter-CU switching, and also has knowledge of which downstream nodes and UEs the migrating IAB node is connected to. In these scenarios,
If the downstream node is dual-connected, there is no need to perform inter-CU switching with the parent node, and thus the CU directly performs a secondary node change procedure to select a new parent node for the node.
If the downstream node is single-connected, one of the two following procedures may be implemented.
Implementation 1: The migrating IAB node notifies the child node of the inter-CU switching operation through the BAP control PDU or MAC CE. In some embodiments, the child node sends a measurement report to the original donor CU, and the original donor CU switches the child node to another parent node. In other embodiments, the child node performs a re-establishment procedure to another parent node.
Implementation 2: The original donor CU informs the downstream node of its parent node inter-CU switchover through an RRC or F1-AP message. If the downstream node does not follow the switchover, the node may send a measurement report to the original donor CU, and the original donor CU switches the child node to another parent node. Alternatively, the node may performs a re-establishment procedure to another parent node.

Embodiments of the disclosed technology provides methods and systems for selecting a target donor CU. In some embodiments, the original donor CU sends a handover request to multiple donor CUs based on a measurement report. After receiving one or more handover request acknowledge messages, the original donor CU uses the source NG-RAN node UE XnAP IDs therein to determine the target donor CU. In an example, the original donor CU may choose the donor that accepts the most IAB nodes and UEs as the target donor CU. For this selected target donor CU, the switching of some IAB nodes may have been rejected. In this scenario, one of the two following procedures may be implemented.

Implementation 1: If the original donor CU has received the measurement report of these rejected IAB nodes, it can instruct these IAB nodes to switch. If the original donor CU has not received the measurement report of these IAB nodes, then these IAB nodes can report the measurement report and then switch.

Implementation 2: The original donor CU sends an RRC message to the rejected IAB nodes. This RRC message includes:
A cause that indicates that the (downstream) IAB node cannot be switched with the parent node
IAB frequency information that is supported
The cell ID supporting the IAB functionality under the currently registered Public Land Mobile Network (PLMN);
IAB-supporting cell IDs in all PLMNs; and/or
a Cell Global Identity (CGI), a Physical Cell Identifier (PCI), or a CGI and a PCI.

Figure 3:
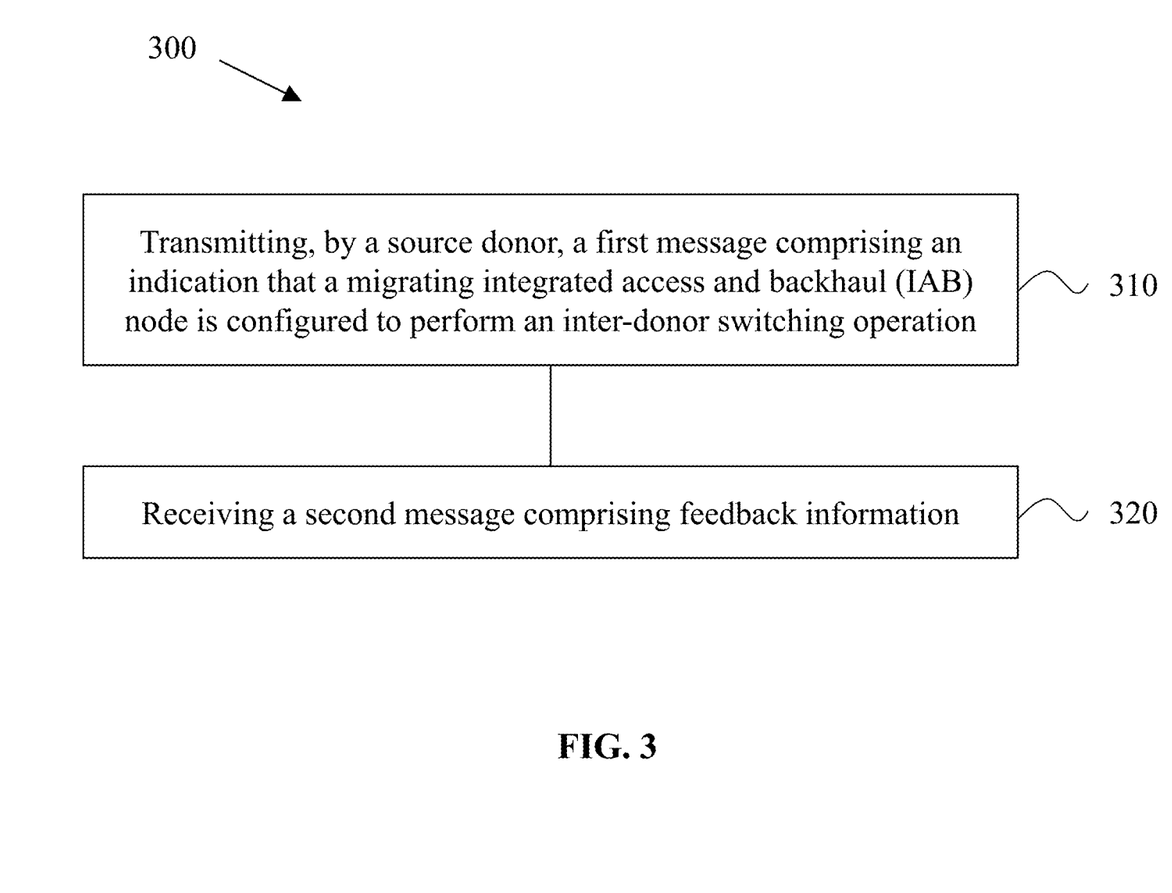
FIG. 3 shows an example of a method for wireless communication.

FIG. 3 shows an example of a wireless communication method 300 for inter-donor topology adaptation in IAB networks. The method 300 includes, at operation 310, transmitting, by a source donor, a first message comprising an indication that a migrating integrated access and backhaul (IAB) node is configured to perform an inter-donor switching operation.

The method 300 includes, at operation 320, receiving a second message comprising feedback information.

Figure 4:
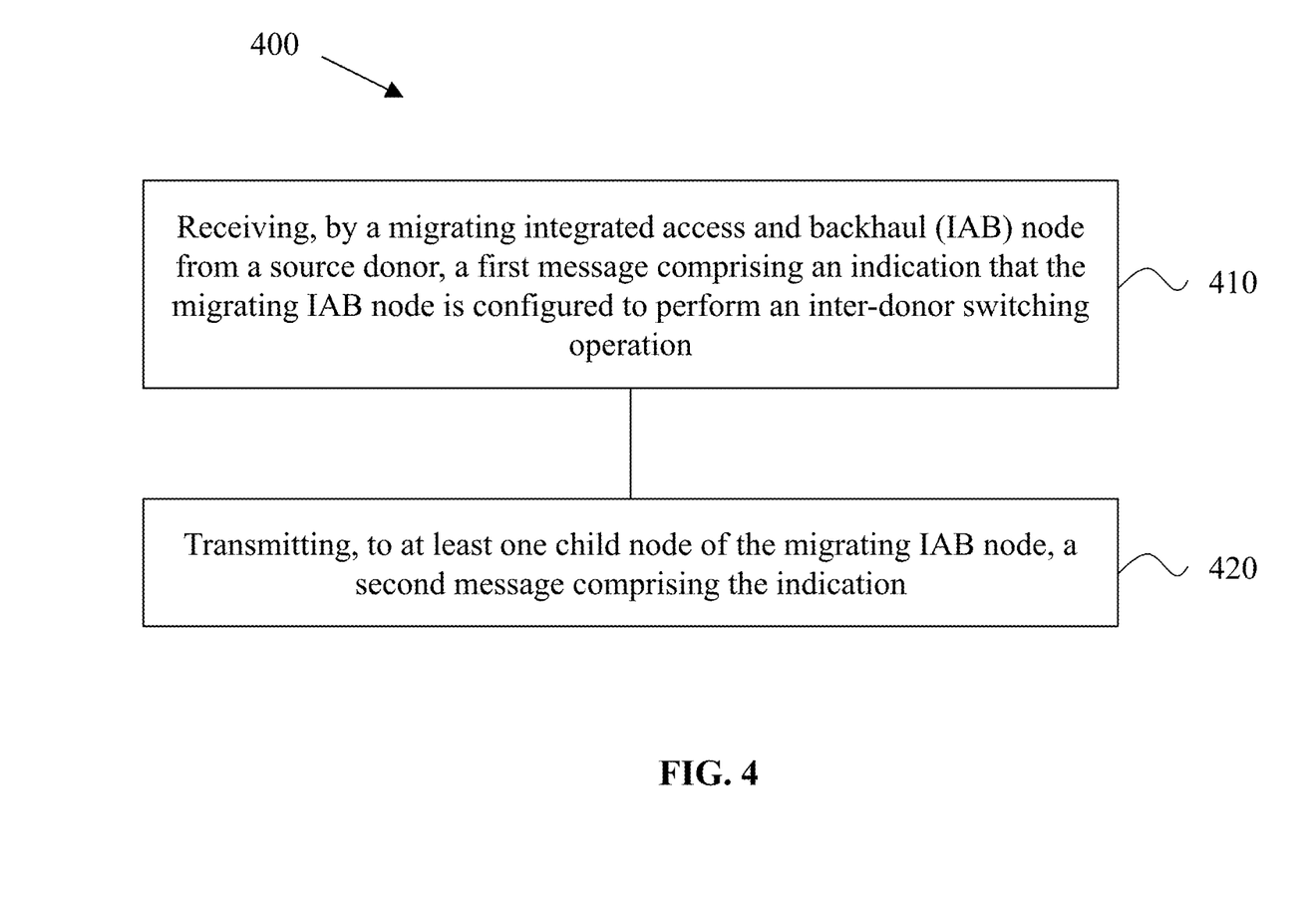
FIG. 4 shows an example of another method for wireless communication.

FIG. 4 shows an example of another wireless communication method 400 for inter-donor topology adaptation in IAB networks. The method 400 includes, at operation 410, receiving, by a migrating integrated access and backhaul (IAB) node from a source donor, a first message comprising an indication that the migrating IAB node is configured to perform an inter-donor switching operation.

The method 400 includes, at operation 420, transmitting, to at least one child node of the migrating IAB node, a second message comprising the indication.

In some embodiments, the following technical solutions can be implemented:
A1. A method for wireless communication, comprising: transmitting, by a source donor, a first message comprising an indication that a migrating integrated access and backhaul (IAB) node is configured to perform an inter-donor switching operation; and receiving a second message comprising feedback information, wherein the source donor is communicatively coupled to the migrating IAB node and a plurality of nodes that are downstream from the migrating IAB node.
A2. The method of solution A1, wherein the plurality of nodes comprise one or more IAB nodes.
A3. The method of solution A1, further comprising: receiving, from a one of the plurality of nodes, a Radio Resource Control (RRC) message comprising a measurement report.
A4. The method of solution A1, wherein the feedback information comprises an indication that one of the plurality of nodes is intending to perform the inter-donor switching operation.
A5. The method of solution A4, wherein the migrating IAB node comprises at least one Mobile Termination (MT) to communicate with at least one UE, and wherein the method further comprises: transmitting, to a target donor, a first Xn application protocol (XnAP) message comprising an XnAP identifier and context information for each of the at least one MT and each of the at least one UE.

A6. The method of solution A5, wherein the first XnAP message further comprises a key, assigned by the source donor, for each of the at least one MT and each of the at least one UE.

A7. The method of solution A5 or A6, further comprising: receiving, from the target donor, a second XnAP message comprising a first RRC reconfiguration message for at least one of the plurality of nodes and a second RRC reconfiguration message for the migrating IAB node.

A8. The method of solution A7, wherein the first RRC reconfiguration message comprises one or more of a new key for the at least one of the plurality of nodes, routing information, a backhaul (BH) radio link control (RLC) channel configuration, a backhaul adaptation protocol (BAP) address, one or more IP addresses, an IP address of the target donor, IP addresses used in a control plane domain, or IP addresses used in a user plane domain.

A9. The method of solution A7, wherein the second RRC reconfiguration message comprises one or more of routing information, a backhaul (BH) radio link control (RLC) channel configuration, a backhaul adaptation protocol (BAP) address, one or more IP addresses, an IP address of the target donor, IP addresses used in a control plane domain, or IP addresses used in a user plane domain.

A10. The method of any of solutions A1 to A9, wherein the first message is transmitted to one or more of the plurality of nodes.

A11. The method of any of solutions A1 to A9, wherein the first message is transmitted to the migrating IAB node.

A12. The method of solution A1, wherein the first message is transmitted to the one of the plurality of nodes, and wherein the first message further comprises one or more of a cause indicating that the one of the plurality of nodes cannot perform the inter-donor switching operation, IAB frequency information, a cell ID support IAB functionality under a Public Land Mobile Network (PLMN) that is currently registered, a plurality of IAB-supporting cell IDs in all PLMNs, a Cell Global Identity (CGI), or a Physical Cell Identifier (PCI).

A13. The method of any of solutions A10 to A12, wherein the first message is a Radio Resource Control (RRC) message or an F1 application protocol (F1AP) message.

A14. A method for wireless communication, comprising: receiving, by a migrating integrated access and backhaul (IAB) node from a source donor, a first message comprising an indication that the migrating IAB node is configured to perform an inter-donor switching operation; and transmitting, to at least one child node of the migrating IAB node, a second message comprising the indication, wherein the source donor is communicatively coupled to the migrating IAB node and a plurality of nodes that are downstream from the migrating IAB node.

A15. The method of solution A14, wherein the indication informs the child node that its parent node is intending to perform the inter-donor switching operation.

A16. The message of solution A14 or A15, wherein the second message is a backhaul adaptation protocol (BAP) control protocol data unit (PDU) or a Medium Access Control (MAC) control element.

A17. A wireless communications apparatus comprising a processor and a memory, wherein the processor is configured to read code from the memory and implement a method recited in any of solutions A1 to A16.

A18. A computer program product comprising a computer-readable program medium code stored thereupon, the code, when executed by a processor, causing the processor to implement a method recited in any of solutions A1 to A16.

In some embodiments, the following technical solutions can be implemented:

B1. A method for inter-donor topology adaptation in wireless communication, comprising: transmitting, by an originating donor, message to IAB node; transmitting, by an originating donor, XnAP message to target donor; receiving, by an originating donor, message from IAB node; receiving, by an originating donor, XnAP message from target donor; transmitting, by a target donor, message to IAB node; and receiving, by a target donor, message from IAB node, wherein the originating donor is communicatively coupled to the migrating IAB node and a plurality of nodes, and wherein the plurality of nodes comprise at least one user equipment (UE) that is downstream of the migrating IAB node.

B2. The method of solution B1, wherein the IAB node can be migrating IAB node or a downstream IAB node, and wherein the downstream IAB node can be child node of migrating IAB node, or the IAB nodes whose UL packets need to be forwarded by the migrating IAB node.

B3. The method of solution B1, wherein the message from source donor to IAB node can be RRC or F1AP message, the message from IAB node to source donor can be RRC or F1AP message as well.

B4. The method of solution B3, the message from source donor to IAB node, wherein the message comprises inter-donor handover indication or parent node inter-donor handover indication.

B5. The method of solution B3, after receiving the message, the IAB node shall construct BAP PDU(s), or the IAB node shall generate the MAC control element(s) and then send the BAP PDU(s) or MAC CE(s) to all its child nodes, and wherein the BAP PDU or MAC CE indicates the IAB node will perform inter-CU handover.

B6. The method of solution B3, the message from IAB node to source donor, wherein the message comprises inter-donor handover indication to inform source donor that it agrees to perform inter-CU handover.

B7. The method of solution B3, the message from IAB node to source donor, wherein the message comprises a measurement report.

B8. The method of solution B1, wherein the XnAP message from source donor to target donor comprises one or more of the Source NG-RAN node UE XnAP ID(s) of IAB nodes and the UEs connected to all the IAB nodes, UE context information, IAB node Mobile-Termination (MT) context information, BH RLC channel information of the IAB node, and/or a key, assigned by the originating donor CU, for each of the at least one MT and each of the at least one UE.

B9. The method of solution B1, wherein the XnAP message from target donor to source donor comprises one or more of the target NG-RAN node UE XnAP ID(s) of the accepted IAB nodes and the accepted UEs connected to the accepted IAB nodes, the source NG- RAN node UE XnAP ID(s) of the accepted IAB nodes and the accepted UEs connected to the accepted IAB nodes, RRC message(s) for accepted IAB node(s), and/or RRC message(s) for accepted UE(s), wherein the accepted IAB node or UE is the IAB node or UE whose QoS requirements can be accepted by the target donor.

B10. The method of solution B9, wherein the RRC message for downstream IAB node comprises one or more of an indication used to indicate the message is from target donor, a new key for the IAB node MT, routing information, backhaul (BH) radio link control (RLC) channel configuration information, a backhaul adaptation protocol (BAP) address or an IP address of the target donor CU.

B11. The method of solution B9, wherein the RRC message for migrating IAB node comprises one or more of routing information, backhaul (BH) radio link control (RLC) channel configuration information, a backhaul adaptation protocol (BAP) address or an IP address of the target donor CU.

B12. The method of solution B9, wherein the RRC message for IAB node comprises IP addresses, IP addresses used in control plane domain, IP addresses used in user plane domain.

B13. The method of solution B1, after the IAB node receives F1AP message from target donor, it shall construct BAP PDU(s), or the IAB node shall generate the MAC control element(s), and then send the BAP PDU(s) or MAC CE(s) to all its child nodes. The BAP PDU or MAC CE indicates that the IAB node can forward data.

B14. The method of solution B1, after the target donor sends F1AP message to IAB node, it shall send RRC message to child node of the IAB node by using the key received from source donor previously.

B15. The method of solution B14, wherein the RRC message comprises one or more of a new key, routing information, backhaul (BH) radio link control (RLC) channel configuration information, a backhaul adaptation protocol (BAP) address or an IP address of the target donor CU.

B16. The method of solution B14, wherein the RRC message comprises IP addresses, IP addresses used in control plane domain, IP addresses used in user plane domain.

B17. The method of solution B13 and B14, the child node shall send RRC Reconfiguration Complete message to target donor.

B18. The method of solution B17, the RRC Reconfiguration Complete message comprises IP addresses, IP addresses used in control plane domain, IP addresses used in user plane domain.

B19. The method of solution B1, wherein the message from source donor to IAB node comprises one or more of a cause indicating that the one of the plurality of nodes cannot perform the inter-donor switching operation, IAB frequency information, a cell ID support IAB functionality under a Public Land Mobile Network (PLMN) that is currently registered, a plurality of IAB-supporting cell IDs in all PLMNs, a Cell Global Identity (CGI), a Physical Cell Identifier (PCI), or the CGI and the PCI.

B20. A wireless communications apparatus comprising a processor and a memory, wherein the processor is configured to read code from the memory and implement a method recited in any of solutions B1 to B19.

B21. A computer program product comprising a computer-readable program medium code stored thereupon, the code, when executed by a processor, causing the processor to implement a method recited in any of solutions B1 to B19.

Figure 5:
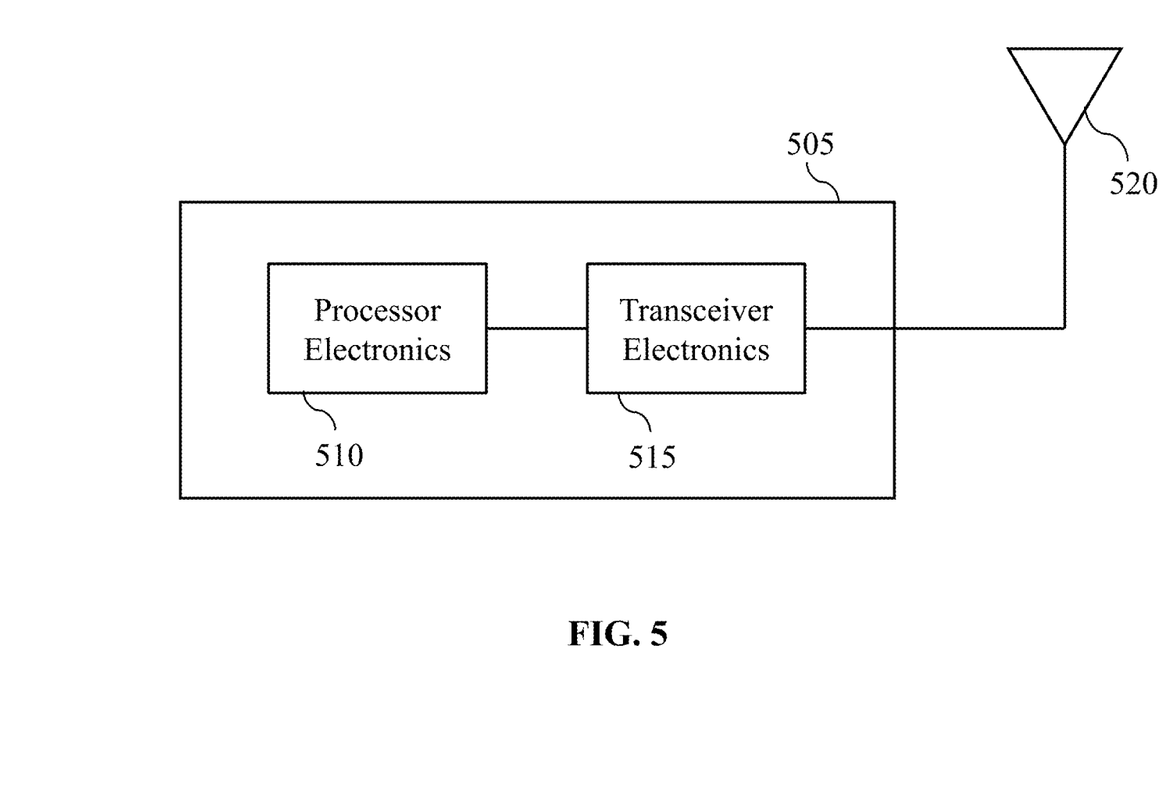
FIG. 5 is a block diagram representation of a portion of an apparatus that can be used to implement methods and techniques of the presently disclosed technology.

FIG. 5 is a block diagram representation of a portion of an apparatus, in accordance with some embodiments of the presently disclosed technology. An apparatus 505, such as a base station or a wireless device (or UE), can include processor electronics 510 such as a microprocessor that implements one or more of the techniques presented in this document. The apparatus 505 can include transceiver electronics 515 to send and/or receive wireless signals over one or more communication interfaces such as antenna(s) 520. The apparatus 505 can include other communication interfaces for transmitting and receiving data. Apparatus 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the apparatus 505.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
transmitting, by a source donor, a first message comprising an indication that a migrating integrated access and backhaul (IAB) node is configured to perform an inter-donor switching operation, wherein the first message is a Radio Resource Control (RRC) message or an F1 application protocol (F1AP) message;
receiving, by the source donor, a second message comprising feedback information,
wherein the source donor is communicatively coupled to the migrating IAB node and a plurality of nodes that are downstream from the migrating IAB node, wherein the first message is transmitted to one or more of the plurality of nodes or to the migrating IAB node, wherein the second message comprising the feedback information is received from one of the plurality of nodes, wherein the feedback information comprises an indication that the one of the plurality of nodes approves the inter-donor switching operation for the migrating IAB node and is intending to perform the inter-donor switching operation with the migrating IAB node, wherein the one of the plurality of nodes is a child node of the migrating IAB node; and
in response to receiving the indication that the child node approves the inter-donor switching operation for the migrating IAB node and is intending to perform the inter-donor switching operation with the migrating IAB node, transmitting, by the source donor to a grandchild node, a third message comprising the indication that the child node is intending to perform the inter-donor switching operation with the migrating IAB node, wherein the grandchild node is a child node of the child node of the migrating IAB node; and
receiving, by the source donor, a fourth message comprising an indication that the grandchild node is intending to perform the inter-donor switching operation with the child node and with the migrating IAB node.

2. The method of claim 1, wherein the feedback information comprises an indication that one of the plurality of nodes is intending to perform the inter-donor switching operation.

3. The method of claim 1, wherein the migrating IAB node comprises at least one Mobile Termination (MT) to communicate with at least one UE, and wherein the method further comprises:
transmitting, to a target donor, a first Xn application protocol (XnAP) message comprising an XnAP identifier and context information for each of the at least one MT and each of the at least one UE.

4. The method of claim 3, wherein the first XnAP message further comprises a key, assigned by the source donor, for each of the at least one MT and each of the at least one UE.

5. The method of claim 3, further comprising:
receiving, from the target donor, a second XnAP message comprising a first RRC reconfiguration message for at least one of the plurality of nodes and a second RRC reconfiguration message for the migrating IAB node.

6. The method of claim 5, wherein the first RRC reconfiguration message or the second RRC reconfiguration message comprises one or more of: a new key for the at least one of the plurality of nodes, routing information, a backhaul (BH) radio link control (RLC) channel configuration, a backhaul adaptation protocol (BAP) address, one or more IP addresses, an IP address of the target donor, IP addresses used in a control plane domain, or IP addresses used in a user plane domain.

7. The method of claim 1, wherein the first message is transmitted to the one of the plurality of nodes, and wherein the first message further comprises one or more of a cause indicating that the one of the plurality of nodes cannot perform the inter-donor switching operation, IAB frequency information, a cell ID support IAB functionality under a Public Land Mobile Network (PLMN) that is currently registered, a plurality of IAB-supporting cell IDs in all PLMNs, a Cell Global Identity (CGI), or a Physical Cell Identifier (PCI).

8. A method for wireless communication, comprising:
receiving, by a migrating integrated access and backhaul (IAB) node from a source donor, a first message comprising an indication that the migrating IAB node is configured to perform an inter-donor switching operation; and
transmitting, to a child node of the migrating IAB node, a second message comprising the indication,
wherein the second message comprising the indication causes the child node to transmit feedback information to the source donor, wherein the feedback information comprises an indication that the child node approves the inter-donor switching operation for the migrating IAB node and is intending to perform the inter-donor switching operation with the migrating IAB node,
wherein the source donor is communicatively coupled to the migrating IAB node and a plurality of nodes that are downstream from the migrating IAB node,
wherein the feedback information causes the source donor to transmit, to a grandchild node, a third message comprising the indication that the child node is intending to perform the inter-donor switching operation with the migrating IAB node, wherein the grandchild node is a child node of the child node of the migrating IAB node,
wherein the third message causes the grandchild node to transmit a fourth message comprising an indication that the grandchild node is intending to perform the inter-donor switching operation with the child node and with the migrating IAB node.

9. The method of claim 8, wherein the indication informs the child node that its parent node is intending to perform the inter-donor switching operation.

10. The method of claim 8, wherein the second message is a backhaul adaptation protocol (BAP) control protocol data unit (PDU) or a Medium Access Control (MAC) control element.

11. An apparatus for wireless communication comprising a processor and a memory storing instructions, execution of which by the processor causes the apparatus to:
   transmit a first message comprising an indication that a migrating integrated access and backhaul (IAB) node is configured to perform an inter-donor switching operation; and
   receive a second message comprising feedback information,
   wherein the apparatus is communicatively coupled to the migrating IAB node and a plurality of nodes that are downstream from the migrating IAB node, wherein the first message is transmitted to one or more of the plurality of nodes or to the migrating IAB node, wherein the second message comprising the feedback information is received from one of the plurality of nodes, wherein the feedback information comprises an indication that the one of the plurality of nodes approves the inter-donor switching operation for the migrating IAB node and is intending to perform the inter-donor switching operation with the migrating IAB node, wherein the one of the plurality of nodes is a child node of the migrating IAB node;
   in response to receiving the indication that the child node approves the inter-donor switching operation for the migrating IAB node and is intending to perform the inter-donor switching operation with the migrating IAB node, transmit, to a grandchild node, a third message comprising the indication that the child node is intending to perform the inter-donor switching operation with the migrating IAB node, wherein the grandchild node is a child node of the child node of the migrating IAB node; and
   receive a fourth message comprising an indication that the grandchild node is intending to perform the inter-donor switching operation with the child node and with the migrating IAB node.

12. The apparatus of claim 11, wherein the feedback information comprises an indication that one of the plurality of nodes is intending to perform the inter-donor switching operation.

13. The apparatus of claim 11, wherein the migrating IAB node comprises at least one Mobile Termination (MT) to communicate with at least one UE, and wherein the apparatus is further caused to:
   transmit, to a target donor, a first Xn application protocol (XnAP) message comprising an XnAP identifier and context information for each of the at least one MT and each of the at least one UE.

14. The apparatus of claim 13, wherein the first XnAP message further comprises a key, assigned by the apparatus, for each of the at least one MT and each of the at least one UE.

15. The apparatus of claim 13, wherein the apparatus is further caused to:
   receiving, from the target donor, a second XnAP message comprising a first RRC reconfiguration message for at least one of the plurality of nodes and a second RRC reconfiguration message for the migrating IAB node.

16. The apparatus of claim 15, wherein the first RRC reconfiguration message or the second RRC reconfiguration message comprises one or more of: a new key for the at least one of the plurality of nodes, routing information, a backhaul (BH) radio link control (RLC) channel configuration, a backhaul adaptation protocol (BAP) address, one or more IP addresses, an IP address of the target donor, IP addresses used in a control plane domain, or IP addresses used in a user plane domain.

17. The apparatus of claim 11, wherein the first message is transmitted to the one of the plurality of nodes, and wherein the first message further comprises one or more of a cause indicating that the one of the plurality of nodes cannot perform the inter-donor switching operation, IAB frequency information, a cell ID support IAB functionality under a Public Land Mobile Network (PLMN) that is currently registered, a plurality of IAB-supporting cell IDs in all PLMNs, a Cell Global Identity (CGI), or a Physical Cell Identifier (PCI).

18. An apparatus for wireless communication comprising a processor and a memory storing instructions, execution of which by the processor causes the apparatus to:
   receive, from a source donor, a first message comprising an indication that the apparatus is configured to perform an inter-donor switching operation; and
   transmit, to a child node of the apparatus, a second message comprising the indication,
   wherein the second message comprising the indication causes the child node to transmit feedback information to the source donor, wherein the feedback information comprises an indication that the child node approves the inter-donor switching operation for the apparatus and is intending to perform the inter-donor switching operation with the apparatus,
   wherein the source donor is communicatively coupled to the apparatus and a plurality of nodes that are downstream from the apparatus,
   wherein the feedback information causes the source donor to transmit, to a grandchild node, a third message comprising the indication that the child node is intending to perform the inter-donor switching operation with the apparatus, wherein the grandchild node is a child node of the child node of the apparatus,
   wherein the third message causes the grandchild node to transmit a fourth message comprising an indication that the grandchild node is intending to perform the inter-donor switching operation with the child node and with the apparatus.

19. The apparatus of claim 18, wherein the indication informs the child node that its parent node is intending to perform the inter-donor switching operation.

20. The apparatus of claim 18, wherein the second message is a backhaul adaptation protocol (BAP) control protocol data unit (PDU) or a Medium Access Control (MAC) control element.

* * * * *

UNITED STATES PATENT AND TRADEMARK OFFICE
CERTIFICATE OF CORRECTION

Page 1 of 1

PATENT NO. : 12,439,313 B2
APPLICATION NO. : 17/875948
DATED : October 7, 2025
INVENTOR(S) : Xueying Diao It is certified that error appears in the above-identified patent and that said Letters Patent is hereby corrected as shown below:

In the Specification

In Column 4, Line 20, delete "IDs.of" and insert --IDs of--
In Column 4, Line 63, delete "should to" and insert --should--
In Column 5, Line 5, delete "has" and insert --has been--
In Column 5, Line 60, delete "acknowledge" and insert --acknowledgment--
In Column 6, Line 11, delete "node" and insert --node.--
In Column 6, Line 12, delete "supported" and insert --supported.--
In Column 6, Line 53, delete "from a" and insert --from--

In the Claims

In Column 11, Lines 58-59, in Claim 1, delete "child node of the child node of the" and insert --child node of the--
In Column 12, Line 61, in Claim 8, delete "child node of the child node of the" and insert --child node of the--
In Column 13, Line 40, in Claim 11, delete "child node of the child node of the" and insert --child node of the--
In Column 14, Lines 47-48, in Claim 18, delete "child node of the child node of the" and insert --child node of the--

Signed and Sealed this
Eighteenth Day of November, 2025

John A. Squires
*Director of the United States Patent and Trademark Office*